United States Patent [19]

Kambies

[11] Patent Number: 5,729,400
[45] Date of Patent: Mar. 17, 1998

[54] DATA RECORDER USING STILL FRAMING TECHNIQUES FOR INFORMATION RETRIEVAL AND METHOD

[75] Inventor: Keith A. Kambies, Foster City, Calif.

[73] Assignee: Ampex Corporation, Redwood City, Calif.

[21] Appl. No.: 504,822

[22] Filed: Jul. 20, 1995

Related U.S. Application Data

[62] Division of Ser. No. 322,800, Oct. 13, 1994, abandoned, which is a continuation of Ser. No. 867,268, Apr. 10, 1992, abandoned.

[51] Int. Cl.$^6$ .................................................. G11B 15/467
[52] U.S. Cl. ............................................ 360/77.13; 386/80
[58] Field of Search ................................. 360/70, 77.13, 360/77.14; 386/78, 79, 80, 81

[56] References Cited

U.S. PATENT DOCUMENTS

| | | | |
|---|---|---|---|
| 4,099,211 | 7/1978 | Hathaway. | |
| 4,215,362 | 7/1980 | Ravizza | 360/70 X |
| 4,494,153 | 1/1985 | Ravizza | 360/77.13 X |
| 4,751,586 | 6/1988 | Rodal | 360/73.12 X |
| 4,872,073 | 10/1989 | Fincher et al. | 360/51 |
| 4,916,555 | 4/1990 | Hathaway et al. . | |
| 4,947,272 | 8/1990 | Yokozawa | 360/77.15 |
| 5,047,872 | 9/1991 | Heitmann. | |
| 5,335,119 | 8/1994 | Shih et al. | 360/48 X |

FOREIGN PATENT DOCUMENTS 63-263656  10/1988  Japan.

OTHER PUBLICATIONS

"The Development of the Ampex AST System" by Mark Sanders (appearing in Video Systems, Apr. 1980, pp. 46–53).

"Video Head Assemblies and Scanners" by John W. King and Dennis Ryan, pp. 89–101.

SMPTE 247M, "19-mm Type D-2 Composite Format" SMPTE Journal, Jul. 1990, pp. 592–600.

*Primary Examiner*—Aristotelis M. Psitos
*Assistant Examiner*—James L. Habermehl
*Attorney, Agent, or Firm*—John G. Mesaros; James M. Thomson; Patrick J. O'Shea

[57] ABSTRACT

An automatic scan tracking, helical tape type of data recorder is disclosed herein along with its method of operation. Data is written onto magnetic recording tape along with data retrieval information by means of a rotating scanner assembly forming part of the recorder as the recording tape moves at a given recording speed in cooperative engagement with the scanner assembly. Data is normally retrieved from the recording tape along with the data retrieval information by means of the rotating scanner assembly as the recording tape moves longitudinally at the same given recording speed. In operation, the rotating scanner assembly of the recorder retrieves data and data retrieval information from a segment of the recording tape while the latter is not moving, that is, during a period when the tape is stationary for enabling adjustment of the read head position relative to the track depending on the evaluation of the data resulting from the stationary tape read. Provision is also made for causing the rotating scanner to retrieve data retrieval information from a segment of the recording tape while the latter is accelerating from a still state to its given recording state, with subsequent evaluation of the data and adjustment based on the results.

24 Claims, 3 Drawing Sheets

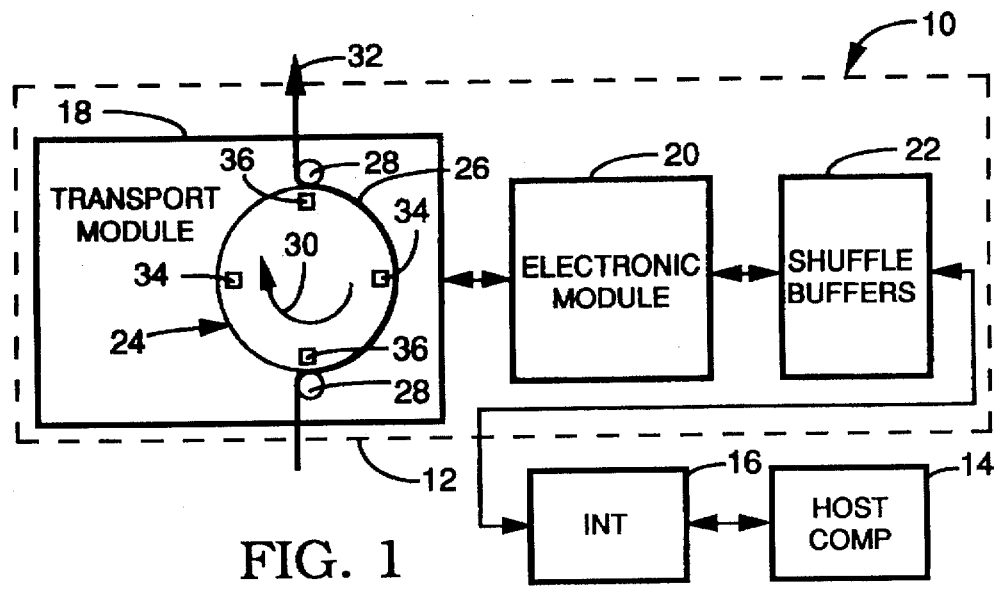
FIG. 1
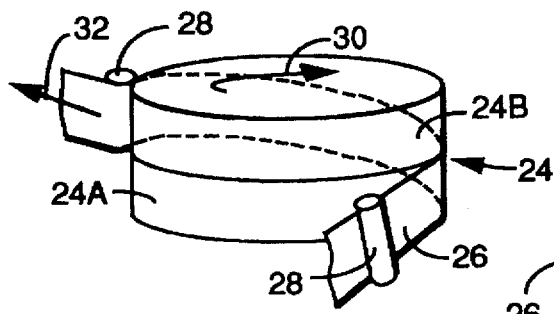
FIG. 2
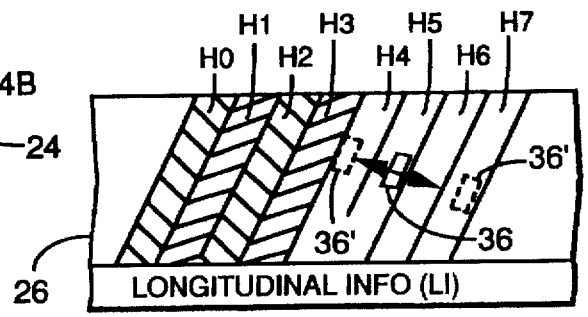
FIG. 3
| F0 | F1 | F2 | F3 | F4 | F5 | F6 | F7 |
|----|----|----|----|----|----|----|----|
QF      SF      DF
DF    SVO   SF
SF             SVO
SVO
FIG. 4
| RUN UP | LE PULSE | HOST DATA AND REDUNDANCY CODES | RUN DOWN |
|--------|----------|--------------------------------|----------|
FIG. 5

DATA RECORDER USING STILL FRAMING TECHNIQUES FOR INFORMATION RETRIEVAL AND METHOD

CROSS REFERENCE TO RELATED APPLICATIONS

This is a divisional of U.S. patent application Ser. No. 08/322,800, filed on Oct. 13, 1994, now abandoned, entitled "DATA RECORDER USING STILL FRAMING TECHNIQUES FOR INFORMATION RETRIEVAL AND METHOD" which is a continuation of Ser. No. 07/867,268, filed Apr. 10, 1992, now abandoned.

FIELD OF THE INVENTION

The present invention relates generally to magnetic recording and reproducing apparatus and, more particularly, to a new and improved data storage and retrieval method and apparatus for an automatic scan tracking (AST) helical data recorder.

BACKGROUND OF THE INVENTION

Ampex Corporation, assignee of the present application, has heretofore developed an AST helical recorder used for storing and retrieving data and also for recording and reproducing video. Detailed descriptions of the various components making up such an apparatus and the way in which it operates may be found in the combination of U.S. Pat. Nos. 4,099,211 and 4,916,555, both of which have been assigned to Ampex Corporation and the articles entitled VIDEO HEAD ASSEMBLIES AND SCANNERS by John W. King and Dennis Ryan and DEVELOPMENT OF THE AMPEX AST SYSTEM by Mark Sanders (appearing in Video Systems, April 1980, pages 46–53). The latter of these two patents, both of which are incorporated herein by reference along with the recited articles, specifically describes the operation of an AST helical recorder for recording and reproducing video. Nevertheless, as will be seen, its teachings, along with those in the '211 patent, are equally applicable to digital data storage and retrieval recorders (as opposed to simply digital video data).

Such helical scan recorders, while finding extensive use in digital video recording and reproducing, also proved to be effective systems for use in archival digital data storage and retrieval systems for off-line and near on-line use. A typical AST helical recorder of the type described in the above recited patents includes magnetic recording tape which is helically wrapped, either substantially entirely or partially, around a cylindrical scanning drum containing write (record) and read (reproduce) heads. The scanning drum (including its associated write/read heads) is rotated in one direction at a relatively high write/read speed, for example, 100 revolutions per second, while at the same time, the helically wrapped tape moves across the surface of the rotating drum, typically in the opposite direction, at a much slower write/read speed, for example 147 mm per second. Under these conditions, information (data or video) is written onto the tape in longitudinally successive, helical scan tracks, as illustrated in FIG. 3 of U.S. Pat. No. 4,916,555, by means of the scanning drum's write head. The information, once written, can be readily retrieved from these tracks by means of the scanning drum's read head.

Without automatic scan tracking, but under ideal conditions, the read head can be made to follow the previously written scan tracks in order to retrieve information from these tracks. These ideal conditions require that the read head be initially precisely aligned with the tracks, that the scanning drum be rotated precisely at its write/read speed and that the recording tape be precisely moved at its write/read speed. Unfortunately, conditions are not always ideal. For example, during play back, although ostensibly at nominal or 1X playback speed, the tape may be moving too fast or too slow relative to the scanning drum, causing the read head to cross the tape at an angle different than the originally written scan tracks, thereby causing misalignment between the read head and the scan tracks they are to follow. Misalignment between the read head and scan tracks may occur even when the same recorder is used to write and read information.

These types of errors can and do occur when one recorder is used to write information and another different recorder is used to read information. This is particularly the case where data recorders are used in large information retrieval systems, commonly referred to as juke boxes, so that a given cassette tape might contain data from as many as four different recorders.

In order to minimize the misalignment problems associated with helical data recorders, automatic scan tracking is utilized, which, as stated above, is described in U.S. Pat. Nos. 4,099,211 and 4,916,555 and the retired articles. This technique allows the read head to deflect with respect to a normal or start position within the scanning drum to follow accurately the previously written scan tracks under less than ideal conditions. The '211 patent describes in detail a particular AST read head or transducer and its associated control components. The '555 patent describes the use of this type of read head in a video recorder, although the AST feature is equally applicable for use in a data recorder. In practice, the read head is moved laterally relative to the scan tracks, in a controlled manner, as it scans the tape in order to accurately follow the tracks.

The advantages which can be attributed to the automatic scan tracking technique assume the desire to retrieve previously recorded data or the desire to reproduce previously recorded video in real time. Indeed, one of the problems that AST addresses is the inability to guarantee that the relative motion between the scanning drum and tape (their respective write/read speeds) will be consistent from recorder to recorder or even from recording to playback using the same recorder. Thus, during playback, if the tape moves faster or slower than its original write/read speed relative to the speed of rotation of the scanning drum (and read head), lateral deflection or movement of the read head must be carefully controlled in order to insure that it remains on track.

The discussion immediately above assumed a desire to retrieve data or video information in real time, that is, at the original write/read speed. In the case of a digital video recorder, automatic scan tracking has been used to playback previously recorded video in (1) faster than real time by speeding up the tape beyond its write/read speed, (2) in slower than real time (slow motion) by slowing down the tape, and (3) in no time (stop motion) by stopping the tape altogether. Each of these cases requires that the read head be controllably moved laterally relative to the scan tracks which were previously written in real time as the scanning drum rotates at its write/read speed. Thus, in, for example, the stop motion or still flaming mode, each time the read head crosses the motionless tape (as the scan drum rotates), it can be made to follow a single track or it can be made to successively and repeatedly follow a number of adjacent tracks in order to fill an entire TV frame. This still flaming technique is described in U.S. Pat. No. 4,916,555.

As indicated heretofore, the present invention relates to improvements in an AST helical computer system digital data recorder (recorder of data for use with computer systems) as contrasted with an AST helical video recorder (recorder of data for use and display on a television monitor, or the like). The former, like the latter, utilizes its AST read head or heads in order to accurately scan previously recorded tracks. However, since a digital data recorder merely stores and retrieves data and is not concerned with reproducing a visual display, to date there has been no reason to incorporate fast motion, slow motion or no motion (still framing) into such a device. In digital video recording, as opposed to digital data recording, in the event of inability to recover a frame of information after one or more attempts due to bit errors, video techniques permit masking of the unrecoverable portion of the video image. Such masking techniques are inapplicable to digital data storage and retrieval systems.

In accordance with one aspect of the invention, there is shown and described a new and improved method and apparatus in digital data recorder systems for enabling a much higher degree of accuracy in data recovery.

In accordance with another aspect of the present invention, the slow motion and no motion capability of automatic scan tracking (AST) is utilized in the digital data recorder in order to more reliably retrieve the data.

SUMMARY OF THE INVENTION

The foregoing and other objects of the invention are accomplished by providing a method and apparatus including a helical scan recorder in a digital data storage system for retrieving data and data retrieval information by means of automatic scan tracking. What is meant by data is substantive information previously written and stored onto the tape by an external source, for example a host computer, such data sometimes being referred to as user data. What is meant by data retrieval information is information written onto the tape along with the user data but internally (rather than externally) by the recorder itself in order to more accurately retrieve the data. That is, during write or record operations, the data retrieval information (data which relates to where things are and how things are happening) is written in and included in the helical scan track along with the user data and, during playback the data retrieval information is itself retrieved and used by the recorder to retrieve the user data.

The user data is written onto a magnetic recording tape along with the data retrieval information by means of a rotating scanner assembly as the recording tape moves longitudinally at its intended or nominal write/read speed in cooperative engagement with the scanner assembly. In normal use, the user data is retrieved in real time, that is, it is retrieved from the recording tape along with the data retrieval information by means of the rotating scanner assembly as the recording tape moves at its intended write/read speed. Heretofore, to applicant's knowledge, helical data recorders for use in digital data storage systems have retrieved data and data retrieval information in real time only resulting in a number of disadvantages to be discussed hereinafter.

In accordance with the present invention, with the tape stopped, or ramping up (accelerating) to nominal speed from a stop, the rotating scanner assembly reads and retrieves data retrieval information and, sometimes, even data from a segment of the recording tape while the latter is not moving or moving slower than its intended write/read speed. The data tracks on the tape are recorded in double flames, with each frame consisting of two fields, with each field consisting of four helical scan track pairs. The first helical scan track pair of each group or field of four track pairs includes a "mark" identifying it as the first scan of the field. With the tape stopped, the read heads of the rotating scanning drum read four track pairs, first in order to ascertain if one of the tracks includes the mark in order to determine the start of a field of data, and secondly, if the start of a field, to read the data retrieval information from a group of tracks (e.g., four tracks) to determine the error rate information during the data transfer in order to provide an indication of need for head deflection or alignment relative to the track prior to reading of further information or data. This process is repeated during head deflection until such time as the error rate is low enough to indicate that what has been read is good. In another aspect, such reading and adjustment is taking place during ramp up to nominal play back speed.

Other objects, features and advantages of the invention will become apparent from a reading of the specification when taken in conjunction with the drawings, wherein like reference numerals refer to like elements in the several views.

BRIEF DESCRIPTION OF THE DRAWINGS

FIG. 1 is a block diagram of an overall data storage and retrieval system including an AST helical data recorder in accordance with the present invention;

FIG. 2 diagrammatically illustrates, in perspective view, a half-wrap (180°) scan drum and cooperating longitudinal recording tape forming part of the recorder of FIG. 1;

FIG. 3 diagrammatically illustrates a lengthwise section of the recording tape of FIG. 2, illustrating a series of previously written spaced helical scan tracks and a longitudinal information track;

FIG. 4 diagrammatically illustrates a lengthwise section of the recording tape, specifically depicting successive blocks of data written onto the tape;

FIG. 5 diagramatically illustrates how a previously written individual scan track is typically divided into "data containing" and "data retrieval information containing" segments;

DESCRIPTION OF THE PREFERRED EMBODIMENT

Figure 6:
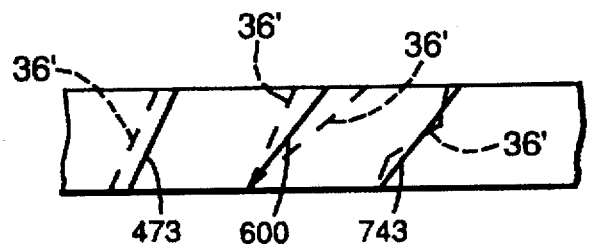
FIG. 6 diagrammatically illustrates some different types of misalignment problems associated with write and read tracks on a recording tape.

Turning now to the drawings, attention is initially directed to FIG. 1 which illustrates an overall digital data storage and retrieval system generally indicated by the reference numeral 10. This system includes an AST helical data recorder, enclosed in broken lines and generally designated 12, a host computer 14 for writing data into and retrieving data from the recorder 12, and a standard interface 16 interconnecting the two. Both the host computer 14 and the interface 16 are readily available components and form no part of the present invention per se. Therefore, no further description of these components of the overall system will be provided. In a similar manner, the data recorder itself, with the exceptions to be described hereinafter, is known in the art, as exemplified by the previously recited U.S. Pat. Nos. 4,099,211 and 4,916,555 and the recited articles. Therefore, only certain aspects of the recorder will be described here.

Still referring to FIG. 1, recorder 12 includes a transport module 18 and an electronic module 20, which includes, a series of shuffle buffers 22, which serve to both shuffle and deshuffle data, the shuffle buffers 22 being depicted separately, although constituting part of the electronic module. The transport module 18 itself includes, among other components, a cylindrical scanning drum 24 of the general type previously described, magnetic recording tape 26, and suitable transport means partially shown at 28 for moving the magnetic recording tape 26 across the scanning drum in the manner illustrated in both FIGS. 1 and 2. As seen in this latter figure, the drum 24 itself includes a lower stationary cylindrical section 24A and an upper rotating cylindrical section 24B. Note from FIG. 1 that the recording tape extends around only half of the scanning drum, in contrast to the scanning drum illustrated in U.S. Pat. No. 4,916,555 where the tape extends around substantially the entire surface of its scanning drum. As will become apparent, the present invention is equally applicable to each of these configurations as well as others.

From FIG. 2 it can be seen that the tape initially engages scanning drum 24 along its lower stationary section 24A and exits the scanning drum along its top rotating section 24B. As will be seen hereinafter, by rotating the upper section 24B of the scanning drum clockwise, as indicated by arrow 30, at its write/read speed while tape 26 is moving longitudinally in the direction of arrow 32 at its write/read speed, information bearing helical scan tracks of the type previously described can be written onto the tape. To this end, transport module 18 includes suitable means for rotating section 24B of scanning drum 24 and for moving tape 26 at the appropriate speeds. At the same time, rotating section 24B of scanning drum 24 includes suitable write/read heads which rotate with it.

In the particular embodiment illustrated in FIG. 1, the scanning drum 24 is shown including two write heads 34 which are positioned diametrically across from one another, and two read heads 36 which are also positioned diametrically across from one another, 90° out of phase with the write heads. In actuality, there are two write heads 34 in each of the locations shown, that is, one on top of, or overlying, the other, and there are two read heads 36 for each of the positions show, again, one on top of the other. In this way, as will be seen hereinafter in conjunction with FIG. 3, during each one-half revolution of the scanning drum 24, two adjacent scan tracks are simultaneously written in the record mode and two adjacent scan tracks are simultaneously read in the playback mode of the recorder.

In addition to the components thus far described, the transport module 18 of data recorder 12 includes other known components which do not require discussion here. It suffices to say that digital data is processed through an equalizer circuit forming part of the transport module 18 as the data is retrieved from recording tape 26. The host computer 14 determines what digital data is to be written and retrieved. The data to be recorded is passed through interface 16 and stored in shuffle buffers 22. It then passes from the shuffle buffers into the electronic module 20 where it is processed and combined with data retrieval information including synchronization and alignment signals, redundancy codes and the like in order to ensure that the data, once recorded, can be readily retrieved. Once the data is processed and combined with data retrieval information by electronic module 20, it is directed into the record amplifier circuit of transport module 18 and thereafter recorded on tape 26 by means of write heads 34.

During playback, previously recorded data is retrieved from the tape 26 along with data retrieval information and both pass through an equalizer circuit within the transport module 18. The data is then transferred to the electronic module 20 with data retrieval information. Some of the data retrieval information, particularly, a copy of information relating to the tracking positions of the read heads 36, remains within the transport module 18 where it is acted on by AST circuitry provided therein. At the same time, the data and data retrieval information reaching the electronic module 20 are acted upon by suitable circuitry within this module to ensure that the data is reliably retrieved. The data is then passed through the shuffle buffers 22 and then interfaced back to the host computer 14 that initially requested it.

Turning to FIG. 3, a section of recording tape 26 is shown including a series of spaced, adjacent transverse or diagonal scan tracks, divided into first and second groups of four scan tracks each corresponding to the ability of the scanning drum to read four tracks on a single revolution with two read heads 36. The first group of four scan tracks is designated H0, H1, H2, and H3, with the second group being designated H4, H5, H6 and H7, and so on. A longitudinal information track LI is also shown extending longitudinally relative to the tape 26 along the bottom edge of the tape. Shown in solid lines on the segment of tape 26 is a single read head 36, with dotted line depictions 36' thereof shown on opposite sides of the solid line depiction. For automatic scan tracking, the head 36 has the capability of aligning itself with respect to a track, on command, that is, it has the capability of deflecting laterally, i.e., in a direction normal or perpendicular to the line of the recorded scan track H1, etc. This deflection capability is ± three fields of data.

When the recorder 10 is operated in its real time recording mode, with the scanning drum 24 rotating clockwise at its write/read speed while the recording tape 26 moves in the opposite direction at its write/read speed, tracks H0 and H1 are simultaneously written onto the tape 26 during the first half revolution of the drum 24 by one pair of overlying write heads 34 while the next successive tracks H2 and H3 are simultaneously written on the tape during the second half revolution of the drum by the other pair of overlying write heads 34. During each successive revolution of the rotating drum, the next group of successive tracks is written, that is tracks H4 and H5 of the next group, followed by H6 and H7 of the next group. In order to magnetically isolate adjacent tracks from one another the adjacent write/read head pairs are angled relative to one another so as to define what appears to be a herringbone configuration, as shown. At the same time, longitudinal information track LI is also written onto the tape by means of a write head which, for convenience, is not shown. Nor is the read head which is used to retrieve information from track LI.

FIG. 4 illustrates the way data and data retrieval information is grouped within the longitudinal extent of the tape. In particular, there is illustrated in FIG. 4 one quad frame of information, formed of eight fields designated F0–F7. One quad frame is comprised of two double frames, with each double frame made up of two single frames or four fields. Thus, two fields make up one single frame. Each field consists of eight helical or diagonal tracks. Therefore, as noted above, since the deflection capability of the read heads 36 is ± three fields, this equates to ± twenty-four helical scan tracks. Thus, one such field is illustrated in FIG. 3. Note that it takes two revolutions of scanning drum 24 to produce one such field. The scan tracks are divided in this manner in order to appropriately synchronize and align the read/write heads with the tape 26. Note specifically in FIG. 4 that the beginning of each quad frame includes a quad frame signal QF, a double frame signal DF, a single frame signal SF, and a servo signal SV0. The double frame signal DF appears at each successive double frame and a single frame signal SF appears at each successive single frame. In addition, a servo signal SVO appears at the beginning of each track pair H0, H1 and H2, H3, etc. These signals reside on longitudinal track LI and make up part of the data. retrieval information recorded onto and retrieved from the tape.

Referring now to FIG. 5, a single, typical scan track of information is depicted. A track begins at its left end as viewed in FIG. 5, starting with a run up segment. Prior to actually writing data and data retrieval information (for example, redundant, codes) onto the track, a synchronization or alignment signal commonly referred to as an LE pulse is written onto certain ones of the tracks, specifically, the first H0/H1 track pair in each field making up a quad frame, except for the last field. This LE pulse is a data marker signal which is a small pulse of about eight microseconds duration and is a low frequency signal that does not normally occur in the decoding sequence. The LE pulse signal aids in the process of lining up the read heads 36 with the appropriate tracks, especially during still framing (when the tape 26 is not moving). After the host data and redundancy codes are provided, each track ends with a run down section, as shown.

The longitudinal information discussed immediately above, that is the quad frame signals, the double frame signals and so on as well as the LE pulse information, serve in the read process to synchronize and align the read heads 36 with their appropriate scan tracks. Thus, if, for example, the tape 26 is traveling at its nominal write/read speed but is out of synch or phase with where it should be, the read head 36 path might cross the tape 26 parallel to its intended read track but not in coincidence therewith. This is exemplified in FIG. 6 by the written track 473 (solid line) and its associated read track path 36' (dotted line). On the other hand, the tape 26 could be running either too slow or too fast, in which case, the read head 36 would traverse the tape at an angle different than the write track, as indicated in track 600, with read head paths 36' and 36" at angles other than parallel to the direction of track 600. Each of these situations would be discovered by means of the synchronization and alignment information obtained from the longitudinal information track and from the LE pulse.

On the other hand, it may be that the particular curvature of the read track path 36' is different than the curvature of the write track as indicated at track 743 in FIG. 6. Under these circumstances, it is not the alignment and synchronization that needs correcting but rather information taken off the read head by means of dithering, for example, as the read head 36 scans the track 743. This is additional information that must be retrieved before data itself can be retrieved. Finally, the problem may not be associated with synchronization, alignment or scan track curvature errors, but rather with the equalization circuit itself. In particular, it may be that the output from the equalization circuit is not accurately producing the appropriate ones and zeros (digital data) and therefore requires adjustment. Through appropriate circuitry in electronic module 20, in response to actual data retrieved, these adjustments can be made.

The information just provided in conjunction with FIGS. 3–6, is intended to emphasize that the recorder 10 must write and read more than the data itself, it must write and read information that will allow the desired data to be rapidly and reliably retrieved. In order to do this, it is necessary to first retrieve the data retrieval information and process it before the data itself can be retrieved. As will be seen hereinafter, the present invention provides a unique, rapid and reliable way to retrieve this data retrieval information.

Figure 7:
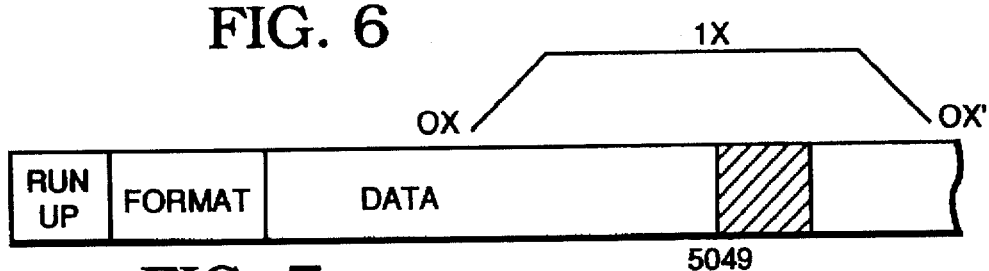
FIGS. 7 and 8 diagrammatically illustrate segments of previously recorded tape from one or more recorders.
Figure 8:
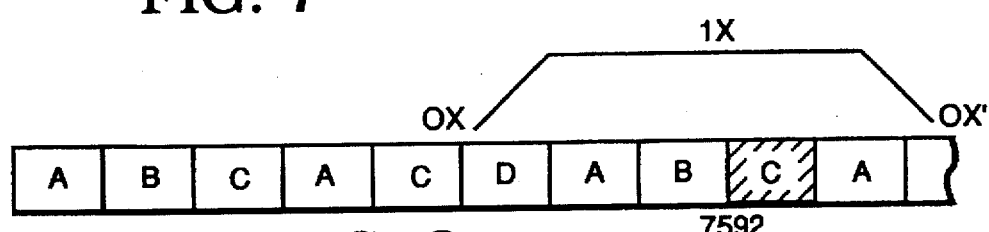

In order to fully appreciate the present invention, it is important to understand how data retrieval information has been typically retrieved heretofore. To this end, FIG. 7 illustrates in a simplistic way a section of recording tape upon which data has been previously written along with data retrieval information from a single data recorder A. FIG. 8 depicts a section of the tape, again, simplistically shown, upon which a number of different blocks of data and data retrieval information have been written from, not one, but several data recorders, specifically recorders A, B, C and D. Let it be assumed first that host computer 14 (see FIG. 1) requests a block of data (shown with cross-hatching) starting at track 5049 of the tape illustrated in FIG. 7. For purposes of convenience the block of data will be referred to as data block 5049. Based on this request and using prior art techniques, while the scanner assembly rotates at its write/read speed, the transport assembly moves the tape to a position which places track 5049 in alignment with one of the read heads. The tape is then backspaced a distance sufficient to place the read head 36 several fields upstream of data block 5049, at which time the tape 26 is momentarily stopped, as indicated graphically at 0X in FIG. 7. The tape is then caused to accelerate to its write/read or record speed indicated graphically at 1X during which time it first begins to retrieve data retrieval information and after which it retrieves the data itself from data block 5049. Thereafter, the tape is again stopped, as indicated at 0X'.

It is important to note that data retrieval information and the data itself are retrieved only during the period that the tape moves at its 1X, or nominal write/read speed, not during acceleration (which can take up a lot of tape). It is also important to note that sufficient data retrieval information must be retrieved before the read head 36 reaches data block 5049 in order to make the appropriate adjustments required to insure that the data itself is accurately retrieved. In the case of the tape illustrated in FIG. 7, this is normally not a problem since there is sufficient time (track space) to retrieve the necessary data retrieval information from the tape immediately prior to data block 5049. This is because the scan tracks preceding data block 5049 (from which the data retrieval information is taken) were written by the same recorder as data block 5049 and therefore the data retrieval information contained in that segment of the tape 26 will most likely accurately reflect the required adjustments that must be made before retrieving the actual data from block 5049.

This is to be contrasted with the segment of tape illustrated in FIG. 8. Assume there that the host computer 14 requests data starting at the first track of block 7592. If the process just described is repeated, the transport module will first place the first track of data block 7592 (shown in cross-hatching) and place the appropriate read head 36 in alignment and then backspace the tape in the manner described above. Note in this case, however, that as the read head 36 is caused to retrieve data retrieval information before reaching block 7592 it is required to pass through a number of blocks of information previously written by different recorders. As a result of this, it has been found that the data retrieval information so retrieved does not always accurately reflect the adjustments that must be made to accurately retrieve the actual data from data block 7592. As will be seen hereinafter, this drawback is eliminated by the present invention.

Figure 9:
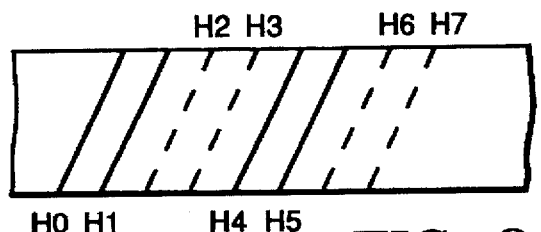
FIG. 9 diagrammatically illustrates a segment of tape containing eight adjacent scan tracks which together form a field.

As indicated previously, U.S. Pat. Nos. 4,009,211 and 4,916,555 together describe a stop motion or still flaming technique during which the read head can be controllably deflected or moved laterally relative to the scan track while the tape 26 itself remains motionless in order to repeatedly scan a number of adjacent tracks. This is exemplified in FIGS. 9, 10A and 10B. FIG. 9 illustrates eight tracks or one field starting with the first group of four tracks H0/H1, then H2/H3, then the second group of four tracks H4/H5, then H6/H7, this number of tracks corresponding to a field, which equates to two complete revolutions, with two read heads 36 per position and two positions.

Figure 10A:
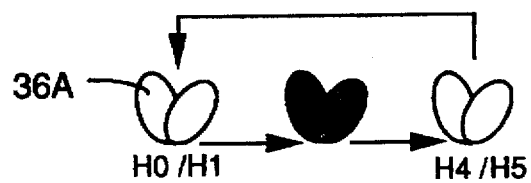
FIGS. 10A and 10B diagrammatically illustrate how the field illustrated in FIG. 9 is scanned while the tape remains still.
Figure 10B:
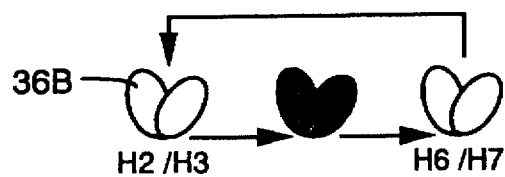

FIGS. 10A and 10B are read scan diagrams which are related in time, with FIG. 10b shifted to the right relative to FIG. 10A thereabove, and will be used to describe the read operation of the read heads 36. The unshaded overlapping ovals represent read operations for the respective heads, with the shaded overlapping ovals representing positions 180 degrees removed, without reading. In still framing, during successive read operations for a given head pair, the read heads are deflected by the automatic scan tracking system to enable a given pair of read heads to read a corresponding pair of successive groups of scan tracks without any displacement of the tape 26 relative to the scanning drum 24B.

By way of example, with the tape 26 itself remaining still and the scanning drum 24B rotating at its write/read speed, a first pair of read heads, indicated as 36A in FIG. 10A, reads the first two tracks H0/H1 of the first scan group of four tracks during the time that the scanner drum rotates a first one-half revolution, that is, during the first half-cycle of its first revolution. During the second half-cycle of the scanner's first revolution, read heads 36A move 180 degrees without reading, as illustrated, whereupon, by reference to FIG. 10B, the other pair of read heads, designated 36B, have moved laterally (that is along the line shown in FIG. 3) a given increment to read the next two scan tracks H2/H3. Thereafter, 180 degrees later, read heads 36A have been deflected a given increment to be in a position to read the first two tracks H4/H5 of the next scan group of four tracks during the first half-cycle of the second revolution of the scanner, while the diametrically opposite pair of heads 36B are not reading. Thereafter, again 180 degrees later, read heads 36B have been deflected a given increment to be in a position to read the next two tracks H6/H7 of the next scan group of four tracks during the second half-cycle of the second revolution of the scanner, while the diametrically opposite pair of heads 36A are not reading, and then returning to their normal positions as indicated by the loop back line. After the second half cycle of the second revolution, read heads 36B are returned to their original undetected position as indicated by the loop back line of FIG. 10B.

Thus, it can be seen that by appropriately controlling the deflection or lateral movement of the read heads 36, from the solid line position in FIG. 3 to the broken line positions 36', a limited number of adjacent scan tracks can be repeatedly read while the tape remains still, as described more fully in the above recited patents. This automatic scan tracking head deflection is utilized in the present invention, as will be described.

As will be described, in accordance with the present invention, in order to enable more accurate retrieval of information, still framing (and slow motion) is utilized, with the data retrieval information of a predetermined number of tracks being read repeatedly. Simultaneously, error rate information is obtained (with the tape stationary), and the error rate information is analyzed to determine which of the read head to track conditions shown in FIG. 3 exist. Thereupon, head deflection is adjusted until least error rate is obtained, and thereafter both user data and data retrieval information are read from the desired location. The scan tracks are read in groups of four scan tracks, the reason being that every fourth helical scan track has a mark (as part of its data retrieval information) that identifies it as the first scan of the field which enables ready determination of a particular location, at least on a relative basis, without reading the actual user data. The data must be placed in particular slots in the deshuffle buffer. There is a pipeline latency of about 10 milliseconds, which means the correct slot is not ascertainable until two scans have been read.

Figure 11A:
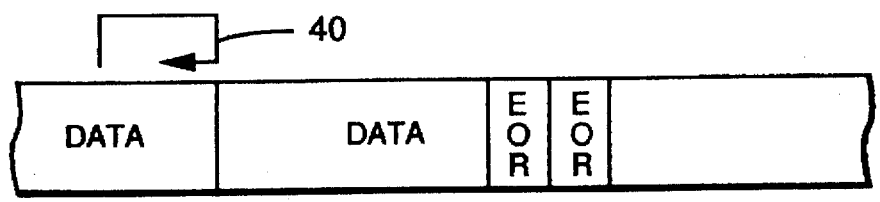
FIGS. 11A–11C depict sections of recording tape and illustrate certain features of the present invention.

Referring now to FIG. 11A, the actual way in which data is written onto a segment of tape in the digital data storage system of the present invention is illustrated. Data is written in successive data blocks, which in the present embodiment are referred to as physical blocks, with a physical block occupying one double frame of data, or 32 helical scan tracks. When the original magnetic tape writing or recording operation is finished an EOR (END OF RECORD) double frame is written after the last block of data.

By way of example, let it be assumed that host computer 14 instructs the data recorder to retrieve information from the data block starting at scan track 4127. The data recorder will proceed in the same manner described previously in conjunction with FIGS. 7 and 8. However, if it cannot accurately retrieve the data for the reasons described there, it is programmed to go into what may be referred to as a still framing mode. That is, it will locate a series of tracks immediately prior to the track 4127 and it will repeatedly still frame across those tracks in the manner described in conjunction with FIGS. 9, 10A and 10B, as diagrammatically illustrated by the still framing arrow 40 in FIG. 11A. During this still framing within the blocks immediately preceding track 4127, it is able to retrieve sufficient data retrieval information in order to look at the error rate information and make appropriate read head deflection adjustments (or other circuitry adjustments) to enable the accurate retrieval of the data from block 4127 without having to scan a large segment of the tape as described previously.

In a preferred embodiment, each time a new block of data is written or recorded onto the tape by appending at the end of the original recording, the EOR blocks immediately preceding it are replaced with what may be referred to as amble data which include scan tracks corresponding physically to the new data tracks that follow but include no actual user data, only data retrieval information. These amble data blocks have the advantage of having been written by the very recorder used to write the subsequent data and at the same time. Since the amble data and physical block data have been written by the same recorder, adjustment or alignment of the read heads by amble data error rate examination provides accurate alignment for reading of data in the subsequent data blocks. This provides more accurate data retrieval information for the subsequent data than is the case where data retrieval information is taken from EOR blocks written by, for example, a different recorder at a different time.

Figure 11B:
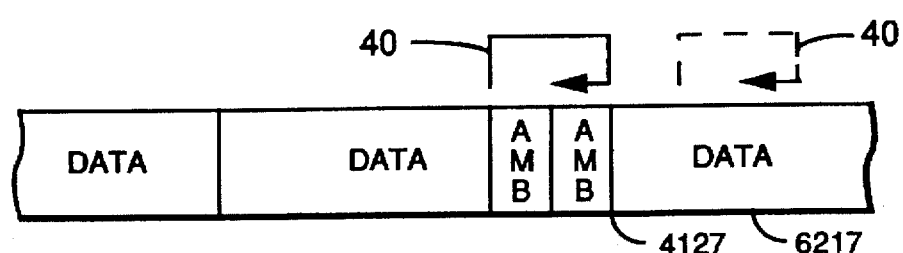

Ideally, the still framing takes place in these amble blocks, as indicated in FIG. 11B. On the other hand, where data is requested later in the block, for example, starting at scan line 6217, it is certainly permissible in accordance with the present invention to retrieve the data retrieval information within the data block itself, as shown. However, there is a particular advantage in still framing within the amble blocks rather than the data blocks themselves. Specifically, there is a slight possibility that the still framing procedure may damage the tape. If it does so within the amble blocks as opposed to the data blocks there is no possibility of losing data.

While it is preferred to still frame in order to retrieve data retrieval information, as described in conjunction with FIGS. 11A and 11B, the present invention also contemplates the utilization of the slow motion techniques described in U.S. Pat. Nos. 4,009,211 and 4,916,555. In this case, data retrieval information is retrieved not while the tape is motionless, as in FIGS. 11A and 11B and not while it is running at its write/read speed, as in FIGS. 7 and 8, but rather at a speed therebetween. In this case, less of the tape is taken up to accelerate to the speed required to retrieve the data retrieval information than is the case where retrieval takes place at the normal write/read speed.

Figure 11C:
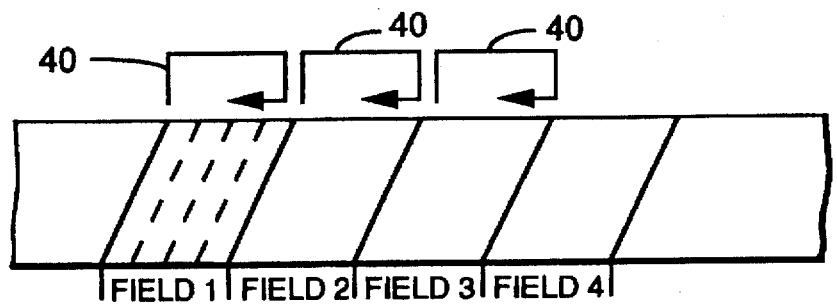

There are instances when sections of the tape are damaged and it is extremely difficult to retrieve the data within those sections. The present invention makes it possible, in some situations, to retrieve the data nevertheless. This is best illustrated in FIG. 11C. Three fields of data are illustrated there. In accordance with the present invention, the data retrieval information and data within field one are repeatedly read by means of still framing until the transport module and electronic module are able to reduce the errors associated with the damage to an acceptable level and thereby retrieve as much data as possible. Suitable circuitry is provided to that end. Once the errors associated with the data in the first field are reduced to an acceptable level, the tape is incrementally moved so that the process can be repeated at field two, field three and so on. In this regard, the redundancy codes written onto the tracks with the data itself (as part of the data retrieval information) are quite helpful to minimize errors.

Figure 12:
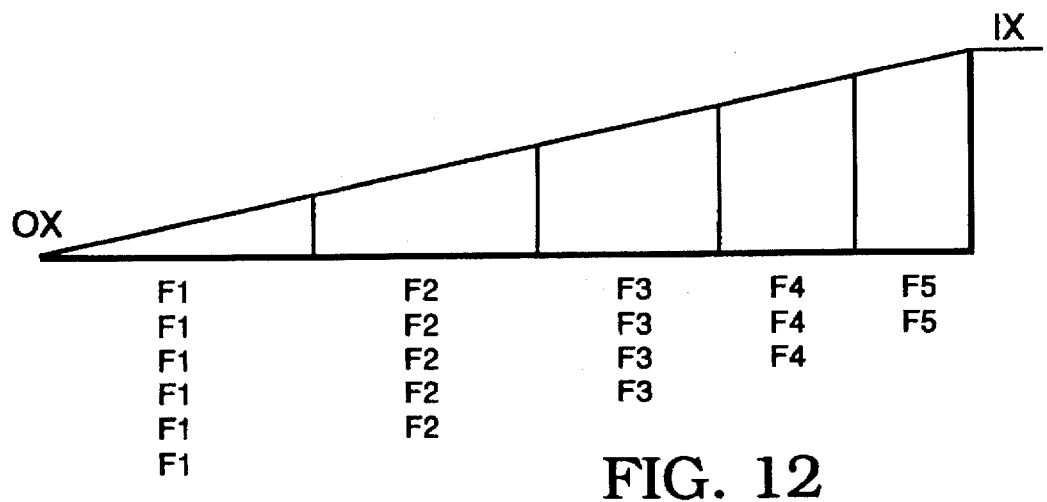
FIG. 12 graphically illustrates still another feature of the present invention.

Finally, attention is directed to FIG. 12 which illustrates still another feature of the present invention. As indicated previously, U.S. Pat. Nos. 4,009,211 and 4,916,555 teach the technique of video slow motion. This is the same as saying that the recorder can read the scan tracks accurately as the tape moves slower than its write/read speed. The present data recorder takes advantage of this feature. Specifically, this feature allows the present recorder to retrieve data retrieval information as the tape accelerates in speed from its still state to its write/read speed. As diagrammatically illustrated in FIG. 12, while the tape is motionless, the appropriate read head or read heads can repeatedly read Fields F1 and they can continue to do so as the tape begins to move. As the tape speeds up, the heads can be controlled laterally to repeatedly read the next field, Field F2, and so on, until the tape reaches its write/read speed. Note that as the speed of the tape increases, the number of times the read head can repeatedly read a given field decreases. Thus, it might only be able to read Field F3 three times and Field F4 two times, and so on. Nevertheless, in this way, it can retrieve information during the acceleration mode and thereby require less tape to retrieve data retrieval information.

To illustrate the flow of the information during the read cycles of FIG. 4, the transport module 20 releases scans in successive groups of four tracks, in successive sets of four scans, with the transport module 20 aligning the scans such that the LE pulse tagged scan is aligned with a field reference provided by the electronic module 20, as shown in tabular form below, with the numerical designation referring to a helical track scan number from a consecutive set of numbered tracks from "0" to "15"(representing four groups of tracks of four tracks each): This sequence is as follows:

TABLE 1

| | | | |
|---|---|---|---|
| 575 | (1) | 12, 13, 14, 15 | |
| | (2) | 8, 9, 10, 11 | |
| | (3) | 4, 5, 6, 7 | 1X |
| | (4) | 0, 1, 2, 3 | |
| 580 | (5) | 12, 13, 14, 15 | |
| | (6) | 8, 9, 10, 11 | |
| | (7) | 8, 9, 10, 11 | |
| | (8) | 4, 5, 6, 7 | <1X |
| | (9) | 4, 5, 6, 7 | |
| 585 | (10) | 4, 5, 6, 7 | |
| | (11) | 0, 1, 2, 3 | |
| | (12) | 0, 1, 2, 3 | 0X |
| | (13) | 0, 1, 2, 3 | |
| 590 | (14) | 0, 1, 2, 3 | |

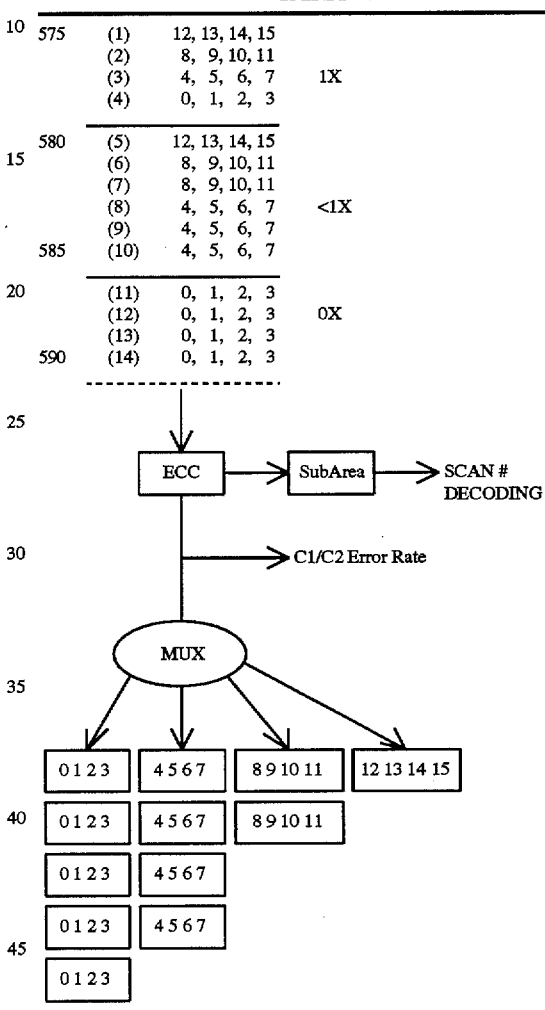

The above Table 1 correlates, in part, to FIG. 12. The horizontal divisions divide the sets up into the uppermost section designated "1X" which correlates to nominal operating speed, that is, the 1X horizontal line portion of the curve of FIG. 12. The next section designated <1X correlates to the ramp-up portion of the curve of FIG. 12, and correspondingly, the "0X" section corresponds to the stop position 0X of FIG. 12. For discussion purposes, reference will be made to the line numbering in the left hand column, that is, (1) to (14).

The flow of the sets of scans released from the transport module 18 flow from bottom to top in the above table and the transport module 18 aligns the scans such that the LE tagged scan aligns with a field reference provided by the electronic module 20. In other words, the scan groups shown at lines (14) to (11) are released first, and followed in successive order of decreasing line numbers thereafter. Since a scan group consists of four sets of four scans, a group under consideration will always consist of the first scan set H0–H3, the second scan set H4–H7, the third scan set H8–H11, and the fourth scan set H12–H15. During this transfer error checking and correction is provided (ECC) on the data being scanned during the still framing, this error checking by the electronic module includes examining the C1/C2 code error rate. After the ECC, the data flows to the sub area for scan number decoding to provide information to the electronic module as to the set of scans currently under scrutiny.

The multiplexer (MUX) is under software control and decides, based on certain decision criteria, at which of the four slots (one scan set per slot) to point (arrows from the MUX) the data within the shuffle buffer 22. The leftmost column enclosed in rectangles in the table is the first scan set, the next column the second scan set, and so on. The decision criteria for the pointer is as follows: (1) if the error checking of the first scan set is beyond the error limit, adjust the head deflection and scan again (repeating if necessary); (2) if the error rate of the first scan set is within limits, go to the next group, if the subsequent scan of a complete group of four successive scan sets includes the correct scan number, go to the next group.

In accordance with the present invention, still framing is utilized on a single scan or field until the AST curvature and offset has been established to compensate for one of the conditions discussed in connection with FIG. 6 (this entails making head deflection adjustments.) The transport equalizer is also adjusted until the electronic module 20 provides an error rate which is acceptable, with that scan then being latched into the first scan of the shuffle buffer 22. Then the next scan is read into the next shuffle buffer 22 slot, one position and scan at a time. On initiation of a standing start and ramp up to nominal play speed (1X), the shuffle buffer 22 is selectively filled with data having successive scan numbers, with error correction and head deflection adjustment being accomplished during ramp up. Effectively, error rate information during still framing or on start up from standstill provides information to be used to tell if the data is good, and to compensate until it is acceptable.

It is to be understood that although preferred embodiments of the present invention have been illustrated and described, various modifications, alternatives and equivalents thereof will become apparent to those skilled in the art and, accordingly, the scope of the present invention should be defined only by the appended claims and equivalent thereof.

I claim:

1. A method of retrieving data from a magnetic recording tape with an automatic scan tracking data recorder, wherein the data is retrieved from said recording tape by said rotating scanner assembly as the recording tape moves at a nominal read speed relative to the scanner assembly, the improvement comprising the step of:

causing said rotating scanner assembly to retrieve data retrieval information from a segment of said recording tape while said recording tape is moving at a speed less than the nominal read speed, wherein said segment of said recording tape in which said data retrieval information is retrieved is a region in which no data is recorded.

2. The improvement according to claim 1 wherein data is written on longitudinally successive helical scan tracks along with data retrieval information, and wherein said data retrieval information is retrieved from said segment while said tape is not moving by causing said scanner assembly to repeatedly scan the scan tracks within said segment.

3. In a method of retrieving data from a magnetic recording tape with an automatic scan tracking data recorder, wherein the data is normally retrieved from said recording tape by said rotating scanner assembly as the recording tape moves at a nominal read speed, the improvement comprising the step of:

causing said rotating scanner assembly to retrieve data retrieval information from a segment of said recording tape while said recording tape is accelerating from a still state to said nominal read speed relative to said rotating scanner assembly, wherein said data retrieval information is retrieved prior to retrieving the data.

4. In a method of operating an automatic scan tracking type of data storage and retrieval apparatus in which data and data retrieval information are written onto and read from a magnetic recording tape by write and read head means as the head means are caused to scan the tape during their rotational movement and the simultaneous movement of the tape at a nominal read speed of the head means and the tape, respectively, the improvement comprising the step of:

causing said read head means to retrieve particular data retrieval information previously written onto a lengthwise segment of said tape by scanning said tape in a predetermined way while the tape speed is less than said nominal read speed relative to the speed of said write and read head means, in order to subsequently retrieve previously recorded data, wherein said lengthwise segment of said recording tape in which said data retrieval information is retrieved is a region in which no data is recorded.

5. The improvement according to claim 4 wherein said read head means is caused to retrieve said particular data retrieval information while said tape is accelerating to said nominal read speed.

6. The improvement according to claim 5 wherein said data is recorded onto said tape along with said data retrieval information in data blocks of varying length, said data being recorded along spaced, helical scan tracks within the blocks while, at the same time, a portion of said data retrieval information is also recorded on spaced helical scan tracks, said blocks of data being separated on said tape by divider blocks containing data retrieval information some of which is also recorded on longitudinally spaced helical scan tracks within said divider blocks.

7. The improvement according to claim 6 further comprising the step of retrieving data retrieval information entirely from within a particular divider block prior to and for the purpose of retrieving data from the particular data block immediately following said particular divider block.

8. The improvement according to claim 7 wherein said particular divider block is recorded onto said tape prior to recording said particular data block and while said tape remains in the same data storage and retrieval apparatus.

9. The improvement according to claim 8 wherein said particular divider block is recorded onto said tape as an amble block over a previously recorded data retrieval information block which served as an end-of-record block for the data block immediately preceding it.

10. The improvement according to claim 4 including the step of retrieving data retrieval information entirely from within a particular one of said data blocks while said tape remains still prior to and for the purpose of retrieving data from the same data block.

11. The improvement according to claim 4 including the step of retrieving data retrieval information entirely from said lengthwise segment of said tape containing a predetermined number of scan tracks while said tape remains still.

12. The improvement according to claim 11 wherein said predetermined number of scan tracks correspond to a field comprising eight scan tracks.

13. The improvement according to claim 11 wherein said data retrieval information is retrieved from said lengthwise segment of said tape by successively scanning said predetermined number of scan tracks a number of times while said tape remains still.

14. The improvement according to claim 4 including the step of retrieving data and data retrieval information entirely from a poorly recorded and/or damaged lengthwise segment of said tape containing a predetermined number of scan tracks while said tape remains still by scanning said tracks a plurality of times.

15. The improvement according to claim 14 including repeating said last mentioned step for successive poorly recorded and/or damaged lengthwise segments of said tape by moving the tape incrementally between such steps.

16. In a method of operating a helical scan type of data storage and retrieval apparatus in which data and data retrieval information are written onto and read off of a longitudinal recording tape by write and read head means as the head means scan the tape during their rotational movement and the simultaneous longitudinal movement of the tape at a given nominal relative write/read speed of the head means and the tape, the improvement comprising the step of:

retrieving particular data retrieval information previously written onto a lengthwise segment of said tape in order to properly position said head means prior to retrieving previously recorded data by scanning said tape in a predetermined way while the tape is accelerating from a still state to said nominal relative write/read speed, such that said particular data retrieval information can be retrieved from a smaller lengthwise segment of tape than would be required if the particular data processing information were retrieved at said nominal relative write/read speed.

17. The improvement according to claim 16 wherein data and data retrieval information are recorded onto said tape along longitudinally spaced helical scan tracks, wherein the segment of tape that is scanned during its acceleration from a still state to said nominal relative write/read speed includes a number of successive groups of scan tracks, and wherein data retrieval information is retrieved the segment during acceleration of said tape by scanning substantially each of said groups of scan tracks a plurality of times before scanning the next group.

18. In an automatic scan tracking data recorder on which data is written onto longitudinal recording tape along with data retrieval information by means of a rotating scanner assembly as the recording tape moves longitudinally at a given recording speed in cooperative engagement with the scanner assembly and in which the data is normally retrieved from said recording tape along with said data retrieval information by means of said rotating scanner assembly as a recording tape moves longitudinally at the same given recording speed, the improvement comprising means for causing said rotating scanner assembly to retrieve data retrieval information from a segment of said recording tape while the latter is not moving, wherein said data retrieval information is retrieved prior to retrieving the data.

19. The improvement according to claim 18 wherein data is written on longitudinally successive helical scan tracks along with data retrieval information, said means for causing said scanner assembly to retrieve said data while said tape is not moving including means for causing said scanner assembly to repeatedly scan the scan tracks within said segment.

20. The improvement according to claim 19 including means for causing said scanner assembly to retrieve data from the scan tracks within said segment of tape as the scanner assembly retrieves data retrieval information.

21. An automatic scan tracking data recorder in which data is written onto longitudinal recording tape along with data retrieval information by a rotating scanner assembly as the recording tape moves longitudinally at a given recording speed relative to and in cooperative engagement with the scanner assembly, wherein the data is retrieved from said recording tape by said rotating scanner assembly as the recording tape moves longitudinally at a nominal relative read speed, the improvement comprising:

means for causing said rotating scanner assembly to retrieve data retrieval information from a segment of said recording tape while said recording tape is accelerating from a still state to said nominal relative read speed, wherein said segment of said recording tape in which said data retrieval information is retrieved is a region in which no data is recorded.

22. An automatic scan tracking type of data storage and retrieval apparatus in which data and data retrieval information are written onto and read from a magnetic recording tape by write and read head means as the head means are caused to scan the tape during their rotational movement and the simultaneous longitudinal movement of the tape at a given nominal relative write/read speed of the head means and the tape, the improvement comprising:

means for causing said read head means to retrieve particular data retrieval information previously written onto a segment of said tape in order to retrieve previously recorded data by scanning said tape in a predetermined way while the tape is moving slower than said nominal relative write/read speed, wherein said data retrieval information is retrieved prior to retrieving the data.

23. The improvement according to claim 22 wherein said means for causing includes means for causing said read head means to retrieve said particular data retrieval information while said tape remains still.

24. An automatic scan tracking helical scan type of data storage and retrieval apparatus in which data and data retrieval information are written onto and read from a magnetic recording tape by write and read head means as the head means are caused to scan the tape during their rotational movement and the simultaneous longitudinal movement of the tape at a nominal relative write/read speed of the head means and the tape, the improvement comprising:

means for causing said head means to retrieve particular data retrieval information previously written onto a lengthwise segment of said tape in order to retrieve previously recorded data by scanning said tape in a predetermined way while the tape is accelerating from a still state to the nominal relative write/read speed, wherein said lengthwise segment of said recording tape in which said data retrieval information is retrieved is a region in which no data is recorded.

* * * * *